United States Patent Office 2,979,488
Patented Apr. 11, 1961

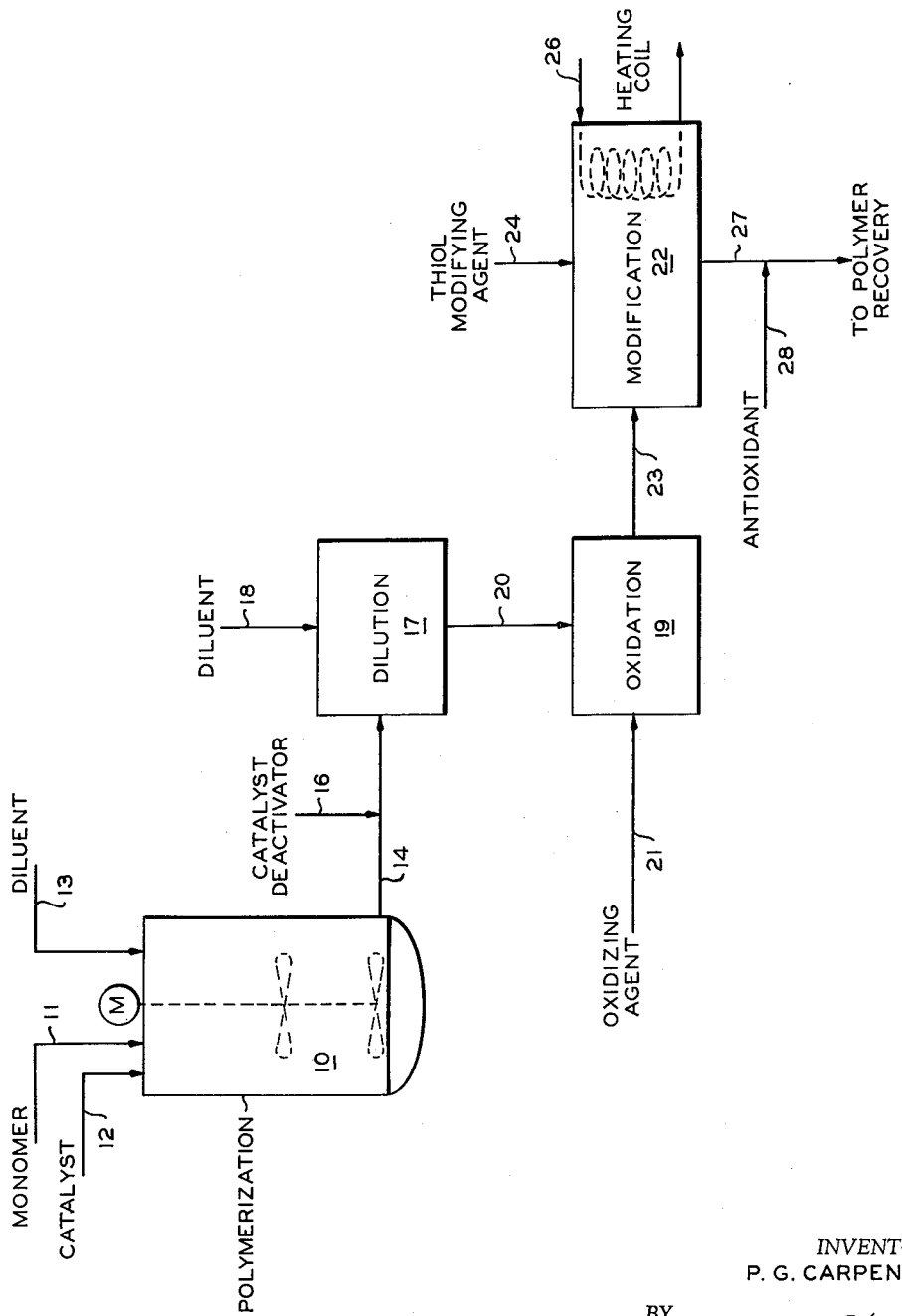

2,979,488

MODIFICATION OF LINEAR RUBBERY POLYMERS

Paul G. Carpenter, Baton Rouge, La., assignor to Phillips Petroleum Company, a corporation of Delaware Filed Sept. 30, 1957, Ser. No. 687,134

13 Claims. (Cl. 260—79)

This invention relates to a linear rubbery polymer modified for improved processability and to its method of production. In another aspect this invention relates to a modified polymer of 1,3-butadiene containing a high percentage of cis 1,4 configuration. In one of its more specific aspects this invention relates to a polymer comprising a high percentage of cis 1,4-polybutadiene modified for improved processability and to a method of preparing same.

Natural rubber has certain advantages over synthetic elastomers which make it particularly valuable in the manufacture of truck tire carcasses. One of these properties is low hysteresis which enables natural rubber tire stock to operate at lower temperatures. In addition, natural rubber is generally superior to synthetic in the property of tack which enables plies of natural rubber when placed together to adhere without the use of an adhesive. Improved linear polymers prepared by polymerizing conjugated dienes in the presence of an organo-metal catalyst system resemble natural rubber in the properties of tack and low hysteresis. These polymers, however, tend to have high inherent viscosities thereby making them difficult to process. Polymerization conditions and catalyst amounts can be adjusted to produce polymers of low viscosity; however, this leads to other difficulties, such as lowered yields.

According to my invention an improved linear rubbery polymer having a low inherent viscosity is provided by polymerizing conjugated dienes in the presence of an organometal catalyst system, subjecting the polymer while in solution to the oxidizing action of peroxidic oxygen by which double bonds are broken and reacting the thus formed polymeric free radicals with a compound containing the thiol group. The process of my invention is particularly valuable in preparing modified cis 1,4-polybutadiene. The polymers thus formed have generally lower hysteresis and better tack properties than other synthetic elastomers and are, in addition, quite easily processed, having inherent viscosities considerably lower than the unmodified polymers of the organometal catalyzed type. With the same degree of cross-linking, the lower the inherent viscosity, the lower the Mooney value and processability is increased both before and after milling.

It is an object of my invention to provide an improved synthetic elastomer which is linear, soluble and easily processed.

It is another object of my invention to provide a method of modifying organometal catalyzed polymers of conjugated dienes to improve their processability.

A further object is to provide a polymer of cis 1,4-polybutadiene having a low inherent viscosity.

A still further object is to provide a method of preparing such a polymer.

Other objects, advantages and features of this invention will be apparent to those skilled in the art from the following description, examples and drawing which depicts schematically one embodiment of the process of my invention.

The preparation of the polymers of my invention begins by polymerizing a monomer system comprising a conjugated diene having from 4 to 8 carbon atoms in the presence of a catalyst system comprising (a) a hydride or organo compound of one of the metals aluminum, gallium, indium, thallium and beryllium, and (b) a di-, tri- or tetrahalide of a group IV metal, such as titanium, silicon, thorium, zirconium, tin, lead, hafnium, germanium, or cerium.

This process and the polymers formed therefrom is described in greater detail in the copending application of Robert P. Zelinski et al., Serial No. 541,033, filed October 17, 1955.

The hydride or organo compounds used in these catalyst systems correspond to the general formula $MR_x$, wherein M is one of the metals aluminum, gallium, indium, thallium or beryllium, R is hydrogen, a monovalent saturated acyclic hydrocarbon radical, a monovalent saturated cyclic hydrocarbon radical, a monovalent aromatic hydrocarbon radical or any combination thereof, and wherein $x$ is equal to the valence of the metal, i.e., 2 or 3. Examples of these catalysts which can be used are $Al(C_2H_5)_3$, $Al(CH_3)_3$, $HAl(C_2H_5)_2$, $H_2AlCH_3$, $Be(CH_3)_2$, $AlH_3$, $Ga(C_3H_7)_3$, $In(CH_3)_3$, $Be(C_6H_5)_2$, $Al(C_6H_{13})_3$, $Al(CH_2-(CH_2)_{18}-CH_3)_3$, $Ga(C_6H_5)_3$, $In(C_6H_5)_3$ and the like. These polymerization catalysts can also be used in the form of their known and stable organic complexes, such as complexes with ethers, thioethers, amines, alkali metal hydrides, alkali metal alkyls or alkali metal aryls. Examples of such complex compounds which can be used as the catalyst are $LiAlH_4$, $NaAl(CH_3)_4$, $NaBe(C_6H_5)_3$, $NaBe(C_2H_5)_3$ and the like.

In admixture with one or more of the $MR_x$ compounds described above, the catalyst comprises at least one group IV metal (Mendelyeev's Periodic System) di-, tri- or tetrahalide. The di-, tri- or tetrahalides of any or all of the group IV metals can be used, including titanium, silicon, thorium, zirconium, tin, lead, hafnium, germanium and cerium. Di-, tri- and tetrachlorides, di-, tri- and tetrabromides, di-, tri- and tetraiodides and di-, tri- and tetrafluorides of the group IV metals can be used in the catalyst composition either individually or as mixtures. The term "group IV metal" as used herein is defined as meaning any or all of the foregoing metals, and silicon is defined as a group IV metal for these purposes. The tetrahalides of titanium and zirconium are the preferred compounds, with the tetrachlorides and tetraiodides of these metals being especially useful because they have a high activity in the process of this invention.

Among catalyst compositions which are preferred are the following: a mixture of titanium tetraiodide and triethylaluminum; a mixture of titanium tetraiodide and tripropylaluminum; a mixture of titanium tetraiodide and tributylaluminum; a mixture of titanium tetrachloride and triethylaluminum; and a mixture of zirconium tetrachloride and triethylaluminum.

The amount of the $MR_x$ compound used in these catalyst compositions is usually in the range of 0.05 to 50 mols per mol of the group IV metal compound. A preferred ratio, however, if from 0.3 to 10 mols of the $MR_x$ compound per mol of the group IV metal di-, tri- or tetrahalide. Increased yields of the rubbery polymer are obtained when using a catalyst composition falling within the preferred ratio.

The monomeric material polymerized to produce rubbery polymers by this process comprises conjugated dienes containing from 4 to 8, inclusive, carbon atoms. Examples of conjugated dienes which can be used include 1,3-butadiene, 2-methyl-1,3-butadiene (isoprene), 2,3-dimethyl-1,3-butadiene, 2-methyl-1,3-pentadiene, chloroprene, 1-cyanobutadiene, 2,3-dimethyl-1,3-pentadiene, 2-methyl-3-ethyl-1,3-pentadiene, 2-methoxybutadiene, 2-phenylbutadiene, and the like. In a preferred process, isoprene is polymerized in the presence of the catalyst above described to form cis 1,4-polyisoprene having a chemical structure substantially the same as that of natural rubber. In another preferred process, 1,3-butadiene is polymerized in the presence of one of the catalyst systems herein described to form polybutadiene in which an excess of 90 percent of the polymer is formed by 1,4 addition of butadiene.

This invention is applicable to the polymerization of the above-defined conjugated dienes either alone or in admixture with each other and/or with, in minor amounts, one or more other compounds containing an active $CH_2=C<$ group which are copolymerizable therewith. Included among these latter compounds are aliphatic 1-olefins having up to and including 8 carbon atoms per molecule, such as ethylene, propylene, 1-butene, 1-hexene, and 1-octene. Branched chain olefins, such as isobutylene, can be used as well as 1,1-dialkyl-substituted and 1,2-dialkyl-substituted ethylenes such as butene-2, pentene-2, hexene-2, heptene-2, 2-methylbutene-1, 2-methylhexene-1, 2-ethylheptene-1, and the like. Other olefins which can be used include di- and polyolefins, such as 1,5-hexadiene, 1,4-pentadiene and 1,4,7-octatriene, and cyclic olefins, such as cyclohexene. Other examples of compounds containing an active $CH_2=C<$ group which are copolymerizable with one or more of the conjugated dienes are styrene, acrylonitrile, methacrylonitrile, methyl acrylate, methyl methacrylate, vinyl acetate, vinyl chloride, 2-methyl-5-vinylpyridine, 2-vinylpyridine, 4-vinylpyridine, and the like.

As mentioned hereinabove, this invention is applicable to the production of rubbery polymers. The term "rubbery polymer" includes elastomeric, vulcanizable polymeric material which after vulcanization, i.e., crosslinking, possesses the properties normally associated with vulcanized rubber, including materials which when compounded and cured exhibit reversible extensibility at 80° F. of over 100 percent of a specimen's original length with a retraction of at least 90 percent within one minute after release of the stress necessary to elongate to 100 percent. The rubbery polymers produced in accordance with this invention are linear, soluble polymers.

The polymer which is most highly preferred for the practice of my invention is cis 1,4-polybutadiene. This polymer is prepared by polymerizing 1,3-butadiene substantially as described above in the presence of a catalyst system comprising trialkylaluminum and titanium tetraiodide. Polybutadiene thus produced is a rubbery polymer containing as high as 90 percent and higher cis 1,4 addition. Preparation of this polymer is described more fully in the copending application of David R. Smith et al., Serial No. 578,166, filed April 16, 1956.

The trialkylaluminum employed in this preferred catalyst system with titanium tetraiodide can be represented by the formula $R_3Al$, wherein R is an alkyl radical containing 1 to 6 carbon atoms. The alkyl groups can be either straight or branched chain alkyls and they can be the same or different. For example, suitable alkyls are ethyl, propyl, isopropyl, n-butyl, isobutyl, pentyl, n-hexyl or isohexyl and the like. Mixed alkyl groups, such as in diisobutyl-monoethylaluminum, are also suitable. Triethylaluminum and triisobutylaluminum are preferred since these compounds have a high activity in the polymerization process.

The amount of trialkylaluminum used in this preferred catalyst composition is usually in the range of 1.25 to 35 mols per mol of titanium tetraiodide. A preferred ratio, however, is from about 1.5 to 10 mols of trialkylaluminum per mol of titanium tetraiodide. Increased yields of the polybutadiene product are obtained when using catalyst compositions falling within these preferred ratios.

The temperature at which the polymerization process is carried out should not exceed 150° C. in order to maintain the degree of gel formation as low as possible. The temperature is generally within the range of −100° C. to 100° C., but it is preferred to operate in the range of about −50° C. to 50° C. In the formation of cis 1,4-polybutadiene, a temperature range of about 10° C. to 50° C. is preferred.

The polymerization is preferably carried out in the presence of an inert, hydrocarbon diluent although the use of such a diluent is not absolutely necessary. The pressure is generally that sufficient to maintain monomeric material substantially in the liquid phase although higher pressures can be employed, if desired, such as by pressurizing with an inert gas. The catalyst concentration can vary over a wide range and is usually in the range of about 0.01 to 15 weight percent or higher, based on the monomeric material charged to the reactor. The preferred catalyst concentration in the production of cis 1,4-polybutadiene is in the range of 0.05 to 10 weight percent and more preferably between 0.05 and 5 weight percent based on the 1,3-butadiene charged to the reactor. In general, at the lower mol ratios of trialkylaluminum to titanium tetraiodide, it is frequently desirable to operate above the minimum level of catalyst concentration.

Suitable diluents for use in the polymerization process are paraffins, cycloparaffins and/or aromatic hydrocarbons which are relatively inert, non-deleterious and liquid under the reaction conditions of the process. The lower molecular weight paraffins, such as propane, butane, and pentane are especially useful when the process is carried out at low temperatures. However, the higher molecular weight paraffins and cycloparaffins such as isooctane, cyclohexane, methylcyclohexane and aromatic diluents such as benzene, toluene and the like, as well as mixtures of these diluents can also be used. Reactor residence time can vary widely, from 1 second to 1 hour for continuous reactions to as long as 24 or more hours for batch processes.

The cis 1,4-polybutadiene produced as described possesses physical properties which render it superior in many respects to conventional synthetic rubbers. Cis 1,4-polybutadiene in vulcanized rubber stocks shows lower hysteresis than conventional synthetic rubber and also exhibits higher resilience, lower freeze point, greater ease of mill breakdown and higher tensile strength at 200° F., than conventional emulsion polymerized polybutadiene.

At the completion of the polymerization reaction, the reaction mixture is treated to inactivate the catalyst, such as by adding an alcohol or oxidizing agent. If an oxidizing agent is employed at this stage, it is preferred to utilize an amount just sufficient to inactivate the catalyst. However, an excess can be employed and this excess will serve as the source of a portion of the peroxidic oxygen in the oxidizing step of this invention as will be explained hereinafter. It is then normally desirable to adjust the concentration of polymer in the diluent to a more dilute solution than that obtained in the polymerization reaction. Concentration of polymer in solution prior to modifying according to my invention is generally in the range of about 0.5 to 10 weight percent. More dilute solutions can be employed if desired, but if the solvent is to be reused in the purification zone, the repurification problem is thereby increased. Higher concentrations yield viscous solutions which are quite difficult to handle. A polymer concentration in the range of about 2 to 7 weight percent is preferred.

The dilute solution of polymer is then contacted with peroxidic oxygen to break double bonds present in the polymer, thus forming free radicals which readily react with the thiol modifying agent. The peroxidic oxygen can be supplied to the reaction zone in the form of peroxides, hydroperoxides, and the like; or the polymer solution can be contacted with air or other oxygen-containing gases, thus forming in situ polymer hydroperoxides which subsequently decompose under the reaction conditions and act as peroxides which are charged as such. Thiol compound is then added to the solution or can be added simultaneously with the oxidizing agent. Suitable thiol compounds can be represented by the general formula R—S—H, wherein R is selected from the group consisting of alkyl, aryl, alkaryl, aralkyl, and the halogen-substituted alkyl, aryl, alkaryl and aralkyl radicals containing from 1–16 carbon atoms.

Some examples of suitable thiols which can be employed in the process of this invention are: methyl mercaptan, isopropyl mercaptan, tert-butyl mercaptan, tert-dodecyl mercaptan, n-hexadecyl mercaptan, phenyl mercaptan, benzyl mercaptan, p-xylyl mercaptan, pentachlorothiophenol and 10-phenyldecyl mercaptan.

The amount of R—S—H compound which is used in the process of the present invention can be from 0.0015 to 0.15 gram mols per 100 grams of polymer being treated. The amount of material which serves as a source of peroxidic oxygen will depend, of course, on the polymer being treated, the temperature at which the treatment is carried out, and the total time which the polymer is subjected to the action of the oxidizing agent and the thiol. For example, when a peroxide or hydroperoxide is being employed, the amount of peroxide used will be generally within the range of from 0.002 to 0.033 gram mols per 100 grams or rubbery polymer being treated. If air or other oxygen-containing gas is employed, it is necessary to utilize sufficient amount of gas to form an amount of polymer hydroperoxide within the specified range necessary when peroxides or hydroperoxides are added directly. It is also within the scope of this invention to utilize combinations of these peroxidic oxygen-supplying agents.

When air or other oxygen-containing gas is employed to form the necessary peroxidic oxygen in situ, the amount of gas employed depends on the temperature and time of the oxidation reaction. The formation of hydroperoxide groups on a polymer chain takes place at a faster rate at higher temperatures. Air or other oxygen containing gas can be bubbled through the polymer solution at a rate within the range between 0.1 and 5 liters of gas per gram of polymer present in the solution. The rate of flow of the gas, the total reaction time, and the desired final inherent viscosity of the polymer are factors which determine the total amount of air or oxygen-containing gas employed. When air or oxygen-containing gas is the sole source of oxygen, an amount between 5.0 and 2,500 liters of oxygen per gram of polymer is used. When air or oxygen-containing gas is used in conjunction with a peroxide, hydroperoxide or the like, an amount of gas sufficient to provide as little as 0.1 liter of oxygen per gram of polymer can be employed.

The temperature at which the rubbery polymer is subjected to the action of an oxidizing agent and a thiol-containing compound can be within the range between 25° and 100° C. The time during which the rubbery polymer is subjected to this action will depend upon the polymer being treated and also upon the desired final inherent viscosity of the polymer. The treating time will generally fall within the range of from 0.25 to 150 hours, preferably between 0.5 and 20 hours.

Referring now to the drawing to describe the complete process of my invention, a schematic operation is shown which can be either batch or continuous. A monomer such as 1,3-butadiene is fed to polymerization zone 10 through line 11. A polymerization catalyst such as that resulting from the reaction of triisobutylaluminum and titanium tetraiodide is fed to the reactor through line 12 while suitable diluent such as benzene or toluene enters through line 13. The amount of these reactants can vary considerably as previously described. One suitable ratio of reactants is 0.5 part by weight of triisobutylaluminum, 0.2 part of titanium tetraiodide and 900 parts of benzene per 100 parts by weight of butadiene. After about 15–20 hours reaction time, or when the polymerization has reached the desired level, the solution of rubbery diene polymer is withdrawn from reactor 10 through line 14. A catalyst deactivator such as isopropyl alcohol is added to the system at this point through line 16, thus terminating the polymerization.

Additional diluent (benzene or toluene) is added to the polymer solution in dilution zone 17, the diluent entering by line 18. A dilute solution of polymer in a concentration of about 5 weight percent passes through line 20 to oxidation zone 19. Oxidizing agent is introduced to the oxidation zone through line 21. One suitable oxidizing agent is benzoyl peroxide. The resultant solution is passed to modification zone 22 via line 23. In this embodiment, 4 grams (0.0165 gram mols) of benzoyl peroxide per 100 grams of polymer present in the solution is used to treat the solution in the oxidation zone. Sufficient thiol compound is then added to the modification zone through line 24 and combines with the polymer. Consistent with above values, 4 grams (0.029 gram mols) of xylyl mercaptan per 100 grams of polymer present is introduced. Modification zone 22 is provided with suitable heating means 26 and the temperature is maintained at about 85° C.

After the desired reaction time has elapsed, for example, about 1.5 hours, the polymer solution is withdrawn from zone 22 through line 27 and a shortstopping agent, such as di-tert-butyl hydroquinone, is added through line 28 to stop the reaction. The polymer thus treated is passed to further recovery steps, such as precipitation with an excess of a precipitating agent, for example, isopropyl alcohol. The precipitated polymer is recovered, washed and dried by conventional means to yield the final product of my invention. By following the above described procedure with the suggested proportions a linear rubbery polymer having an inherent viscosity of about 1.8 can be expected.

The modified rubbery polymers produced by my invention can be compounded by any of the known methods for compounding natural rubber. Vulcanization agents, vulcanization accelerators, reinforcing agents, softeners, fillers, and the like as have been employed with natural rubber and/or rubbery synthetic polymers can likewise be compounded with the polymers of my invention. Elastomer thus produced can be readily fabricated into a number of useful articles, particularly for applications in which the characteristics of natural rubber are desired.

To further illustrate the advantages of my invention the following examples are set forth. Reactants, their proportions, and other specific conditions are presented as being typical and should not be construed to limit the invention unduly.

EXAMPLE I

A series of runs were made in which 1,3-butadiene was polymerized to cis-1,4-polybutadiene and modified by means of a mercaptan. These runs were carried out according to the following procedure.

The polymerization catalyst in these runs comprised triisobutylaluminum and titanium tetraiodide. The desired amount of diluent (toluene in these runs) was added to a one-quart beverage bottle, after which the desired amount of triisobutylaluminum was added to the bottle. Following this charge, the desired amount of titanium tetraiodide was charged to the bottle, and the desired amount of 1,3-butadiene was then charged. During the charging of the catalyst components and the butadiene, the vapor space in the bottle was continuously flushed with nitrogen. After these materials were charged, the bottle was sealed with a neoprene seal and a crown bottle cap which was punched to expose a portion of the neoprene seal. The bottle was then placed in a 30° C.

temperature bath and tumbled in this bath for the duration of the polymerization.

At the end of the desired polymerization period, an amount of oxygen was injected into the bottle by means of a syringe to deactivate the active catalyst. An aliquot was withdrawn from the bottle and the polymer in this amount of solution was precipitated by means of isopropyl alcohol. The inherent viscosity of the polymer was determined. Each bottle in this series of runs contained approximately 20 grams.

The reaction mass in each bottle was then diluted to a 4 percent by weight solution of polymer in toluene. Four parts by weight per 100 parts of polymer of benzoyl peroxide was then charged to each bottle, after which two parts, on the same basis, of a 33⅓ percent by weight solution of xylyl mercaptan in petroleum oil was charged to each bottle. The reaction mass was then maintained at 82° C. for 1.5 hours, after which 1½ percent by weight, based on the monomer originally charged of di-tert-butyl hydroquinone was added to the solution. Two percent by weight, based on monomer originally charged, of phenyl-beta-naphthylamine was then added to the solution, after which the polymer was precipitated by contacting the solution with an excess of isopropyl alcohol. The precipitated polymer was then washed with isopropyl alcohol, drained, and dried at 60° C. in a vacuum oven. The polymerization recipes for these runs are given below, and the results of these runs are expressed below as Table I.

*Polymerization recipes*

|  | Parts by Weight | | |
|---|---|---|---|
|  | D | E | F |
| Butadiene | 100 | 100 | 100 |
| Toluene (purged with N₂ at 2 liters/min.) | 870 | 870 | 870 |
| Triisobutylaluminum (TBA) | 0.554 | 0.693 | 0.693 |
| Titanium tetraiodide (TTI) | 0.208 | 0.260 | 0.260 |
| TBA/TTI mole ratio | 7.5 | 7.5 | 7.5 |
| Temperature, °C | 30 | 30 | 30 |
| Polymerization time, hours | 16.5 | 16.5 | 16.0 |

TABLE I

| Run No. | Recipe | Toluene Purge Time, Minutes | Catalyst Deactivator Oxygen, Millimoles | Inherent Viscosity Before Modifying | Modification | | |
|---|---|---|---|---|---|---|---|
|  |  |  |  |  | Time, Hours | Temp., °C | Inherent Viscosity after Modifying [1] |
| 1 | D | 1 | 23 | 5.11 | 1.0 | 71 | 1.24 |
| 2 | D | 2 | 23 | [2] 6.52 | 1.0 | 71 | 1.60 |
| 3 | E | 1 | 29 | 4.72 | 1.0 | 71 | 1.55 |
| 4 | E | 2 | 29 | [3] 3.92 | 1.0 | 71 | 1.24 |
| 5 | E | 4 | 29 | [4] 4.61 | 1.0 | 71 | 1.56 |
| 6 | F | 2 | 23 | 3.60 | 0.5 | 71 | 1.73 |
| 7 | F | 2 | 23 | 3.62 | 0.5 | 71 | 1.71 |
| 8 | F | 2 | 23 | 3.19 | 0.5 | 71 | 1.76 |
| 9 | F | 2 | 23 | 3.57 | 0.5 | 71 | 1.79 |
| 10 | F | 2 | 23 | 3.38 | 0.5 | 71 | 1.79 |
| 11 | F | 2 | 12 | ([5]) | 0.5 | 71 | 1.09 |

[1] None of the polymers contained gel.
[2] In this run, 21.4 millimoles of dimethylaniline was added along with the di-tert-butyl hydroquinone.
[3] In this run, 13.4 millimoles of dimethylaniline was added along with the di-tert-butyl hydroquinone.
[4] In this run, 26.8 millimoles of dimethylaniline was added along with the di-tert-butyl hydroquinone.
[5] Not measured.

The data of Table I shows the improvement in polymer processability rendered by the process of my invention as evidenced by lowered inherent viscosity.

Polymer of recipes D and E were composited (runs 1–5) and tested for processability. Yield, based on total charge was 94 percent, inherent viscosity 1.82, gel 6 percent, swelling index of gel 127, and Mooney viscosity (ML–4) 25. Thus the polymer value was enhanced from a fabrication standpoint. Polymer of recipe F (runs 6–11) were also composited and showed the same yield but higher inherent viscosity (2.13), gel 27 percent, swelling index of gel 76, and Mooney viscosity (ML–4) 116. The appearance of gel in the composited samples indicates that additional crosslinking, probably due to an insufficient amount of di-tert-butylhydroquinone employed, occurred after the samples were composited.

EXAMPLE II

Two runs were made in which cis-1,4-polybutadiene, prepared by essentially the same polymerization procedure and recipes of the previous examples, was modified by means of a peroxide and a thiol.

In these runs, two samples of cis-polybutadiene, weighing 40 grams each and containing 2 percent phenyl-beta-naphthylamine, were each dissolved in 5 liters of benzene. The inherent viscosity of one of the samples was 9.80, and the inherent viscosity of the other was 9.28. One-half part by weight per 100 parts of polymer of tert-dodecyl mercaptan was added to a portion of each of the solutions. One-half part by weight per 100 parts of polymer of benzoyl peroxide was then added to each portion, and the resulting solution was then maintained at 50° C. over a period of time of several hours. Periodically, samples were taken, and the inherent viscosity was determined. The results are expressed below as Table II.

TABLE II

| Sample A | | Sample B | |
|---|---|---|---|
| Time at 50° C., hours | Inherent Viscosity | Time at 50° C., hours | Inherent Viscosity |
| 0 (original) | 9.80 | 0 (original) | 9.28 |
| 1 | 8.92 | 1 | 8.75 |
| 3 | 8.43 | 2 | 8.88 |
| 4 | 8.27 | 3 | 8.52 |
| 5 | 7.20 | 4 | 8.58 |
| 20 | 5.73 | 5 | 8.26 |
| 35 | 4.51 | 20 | 6.56 |
| 43 | 4.14 |  |  |
| 58 | 3.95 |  |  |

As shown above, even with relatively small amounts of thiol and oxidizing agent and at lower temperatures, the modification of inherent viscosity proceeds as a function of time.

EXAMPLE III

Several runs were made in which a cis-1,4-polybutadiene, prepared by a triisobutylaluminum-titanium tetraiodide catalyzed polymerization and containing no antioxidant, was modified by the process of this invention.

In these runs, a butadiene polymer of 7.0 inherent viscosity was dissolved in benzene to form a solution containing approximately 1 percent rubbery polymer by weight. This solution was divided into several portions, and three series of runs were made utilizing these portions. In the first series, varying amounts of benzoyl peroxide and penta-chlorothiophenol were added to the solution, and the mixture was then maintained at 50° C. The second series was carried out in the same manner as the first, except that xylyl mercaptan, was the thiol used. The third series used no peroxide, and air was bubbled through the solution of polymer and thiol at the rate of approximately one liter per minute. The results of these runs are expressed below as Table III. Each run employing pentachlorothiophenol, contained 0.83 gram of cis-polybutadiene, while each run in which xylyl mercaptan was used contained 1.5 grams of the polymer.

below. One part of xylyl mercaptan per hundred parts (by weight) of rubber and 2.0 parts of benzoyl peroxide on the same basis were added to the solution. The mixture was then placed in a bottle and maintained at 85° C. while bubbling air through the solution at the rate of approximately one liter per minute.

TABLE V
*Inherent viscosity after time in hours*

| 0 | 1 | 2 | 3 | 4 | 5 | 6 | 7 | 8 |
|---|---|---|---|---|---|---|---|---|
| 8.72 | 4.62 | 3.24 | 2.33 | 1.78 | 1.37 | 1.25 | 1.01 | 1.01 |

TABLE III

| Run No. | Parts Benzoyl Peroxide/ 100 Parts Polymer | Parts Thiol/ 100 Parts Polymer | Inherent Viscosity After Time in Hours | | | | | | | | | | | |
|---|---|---|---|---|---|---|---|---|---|---|---|---|---|---|
| | | | 1 | 2 | 3 | 4 | 6 | 8 | 24 | 28 | 48 | 64 | 128 | 144 |
| | | | Pentachlorothiophenol | | | | | | | | | | | |
| 1 | 0.5 | 0.5 | 3.84 | 4.07 | 4.13 | 3.74 | 3.73 | 3.38 | 3.10 | 2.88 | 2.87 | 2.58 | | 2.48 |
| 2 | 1.0 | 1.0 | 4.33 | 3.78 | 3.48 | 3.23 | 3.14 | 2.86 | 2.30 | 2.48 | 2.26 | 2.02 | | 2.07 |
| 3 | 2.0 | 1.0 | 3.48 | 3.24 | 3.03 | 2.71 | 2.62 | 2.55 | 2.18 | 2.09 | 2.04 | 1.74 | | 1.85 |
| 4 | 2.0 | 0.5 | 3.97 | 3.47 | 3.45 | 3.13 | | 2.79 | 2.32 | | 2.16 | 1.66 | | 1.75 |
| | | | Xylyl Mercaptan | | | | | | | | | | | |
| 5 | 0.5 | 0.5 | 4.22 | 3.86 | 4.35 | 3.79 | 2.80 | | 2.45 | | 2.02 | | 2.11 | |
| 6 | 1.0 | 1.0 | 3.59 | 3.38 | 3.19 | 3.07 | 2.87 | | 2.45 | | 2.02 | | 2.11 | |
| 7 | 2.0 | 1.0 | 3.20 | 3.06 | 2.84 | 2.57 | | | 1.42 | | | | | |
| 8 | 2.0 | 0.5 | 3.47 | 3.37 | 3.14 | 3.23 | 2.71 | | 1.74 | | 1.63 | | 1.71 | |
| | | | 1 | 2 | 3 | 4 | 6 | 8 | 10 | 12 | 16 | 18 | 20 | 28 |
| | | | Xylyl Mercaptan | | | | | | | | | | | |
| 9[1] | 0 | 0.5 | 5.16 | 5.09 | 4.83 | 4.63 | 4.53 | | 2.68 | | | 1.74 | | |
| | | | Pentachlorothiophenol | | | | | | | | | | | |
| 10[1] | 0 | 0.5 | 5.86 | 5.86 | 5.96 | 5.80 | 5.15 | 5.46 | 5.28 | 4.89 | 2.96 | | 2.10 | 0.79 |

[1] These runs were carried out at room temperature.

As a control, the polymer solution (no oxidizer or thiol present) was maintained at 50° C. for several hours with the following results:

TABLE IV
*Inherent viscosity after time in hours*

| 1 | 2 | 3 | 128 |
|---|---|---|---|
| 5.25 | 5.24 | 5.18 | 4.82 |

Inherent viscosities were reduced considerably in a relatively short time when benzoyl peroxide was employed as the oxidant and the temperature slightly elevated. Although the results were produced more slowly, the air oxidant at room temperature also proved effective when compared with the control. It can be seen from the above data that a wide variety of process variables can be chosen to practice the process of my invention.

EXAMPLE IV

A sample of cis 1,4-polybutadiene, prepared by a triisobutylaluminum-titanium tetraiodide catalyzed polymerization and having an inherent viscosity of 8.72, was dissolved in benzene to form a solution containing 0.663 gram of polymer in 200 cubic centimeters of solution. Ten cubic centimeters of this solution was withdrawn for the initial viscosity measurement and ten cubic centimeters was withdrawn at the end of each hour as shown In the above run a combination of oxidizing agents were used with excellent results. Air plus benzoyl peroxide at the higher temperature enables a rapid modification of the polymer which would be otherwise quite difficult to process.

In the determination of inherent viscosity for the above examples the procedure is as follows: The polymer sample is dissolved in benzene from a stainless steel screen cage of special design. In each test, 0.1 gram of polymer and 100 centimeters of benzene are employed. After standing 24–48 hours in benzene, the cage is removed and weighed for swelled gel. The cage is then dried in a vacuum oven maintained at a temperature of 70–80° C. and weighed for dry gel. The gel is calculated as the weight per cent of the polymer which is insoluble in benzene. The swelling index of the gel is determined as the weight ratio of swelled gel to dry gel. The inherent viscosity of the rubber is calculated from the viscosity of the gel-free benzene solution relative to that of pure benzene. The relative viscosity is determined by means of Medalia type viscometers supported in a water bath which is maintained at a temperature of 25±0.1° C.

As will be evident to those skilled in the art, various modifications of this invention can be made, or followed, in the light of this foregoing disclosure and discussion, without departing from the spirit or scope thereof.

I claim:
1. A method of preparing an improved rubbery polymer which comprises forming a dilute solution of an elastomer prepared by polymerizing a monomer system comprising a major amount of conjugated diene containing from 4 to 8, inclusive, carbon atoms per molecule in the presence of a catalyst system comprising (a) a compound of a metal selected from the group consisting of aluminum, gallium, indium, thallium and beryllium having the valence linkages thereof individually bound to members selected from the group consisting of hydrogen, saturated acyclic hydrocarbon radicals, saturated cyclic hydrocarbon radicals, and aromatic hydrocarbon radicals and alkali metal hydride, alkali metal alkyl and alkali metal aryl complexes of said compound of a metal and (b) a halide of a group IV metal; treating said solution with an oxidizing agent selected from the group consisting of peroxides, hydroperoxides, oxygen containing gases and mixtures thereof and immediately contacting in a ratio of 100 grams of the polymer with from 0.0015 to 0.15 gram mols of a compound having the general formula R—S—H wherein R is selected from the group consisting of alkyl, aryl, alkaryl and halogen-substituted alkyl, aryl, alkaryl, and aralkyl radicals containing from 1 to 16 carbon atoms, said contacting being conducted within a temperature range of 25 to 100° C. for from 0.25 to 150 hours; and recovering the thus modified polymer from solution.

2. A method of modifying an improved rubbery polymer which has been prepared by polymerizing in solution a monomer system comprising a major amount of conjugated diene containing from 4 to 8, inclusive, carbon atoms per molecule in the presence of a catalyst system comprising (a) a compound of a metal selected from the group consisting of aluminum, gallium, indium, thallium and beryllium having the valence linkages thereof individually bound to members selected from the group consisting of hydrogen, saturated acyclic hydrocarbon radicals, saturated cyclic hydrocarbon radicals, and aromatic hydrocarbon radicals and alkali metal hydride, alkali metal alkyl and alkali metal aryl complexes of said compound of a metal and (b) a halide of a group IV metal, at a temperature in the range of −100° C. 100° C. to form a rubbery, linear polymer, which comprises deactivating the catalyst, diluting the solution to a polymer concentration of about 0.5 to 10 weight percent, subjecting said polymer to the action of an oxidizing agent selected from the group consisting of peroxides, hydroperoxides, oxygen containing gases and mixtures thereof in a ratio equivalent to from 0.002 to 0.33 gram mols of peroxide per 100 grams of polymer, immediately contacting the oxidized polymer with a compound having the general formula R—S—H wherein R is selected from the group consisting of alkyl, aryl, alkaryl, and halogen-substituted alkyl, aryl, alkaryl and aralkyl radicals containing from 1 to 16 carbon atoms, in a ratio of 0.0015 to 0.15 gram mols of said R—S—H compound per 100 grams of polymer, said contacting being conducted within a temperature range of 25 to 100° F. for from 0.25 to 150 hours and precipitating the thus modified polymer.

3. A method according to claim 2 wherein said monomer system consists essentially of 1,3-butadiene.

4. A method according to claim 2 wherein said monomer system consists essentially of isoprene.

5. A polymer prepared by the method of claim 2.

6. A method of modifying an improved rubbery polymer which has been prepared by polymerizing 1,3-butadiene in an inert diluent in the presence of a catalyst system comprising trialkylaluminum wherein the alkyl radical contains from 1 to 6, inclusive, carbon atoms and titanium tetraiodide, thereby forming a linear polymer of predominately cis 1,4-configuration, which comprises subjecting said linear polymer in an 0.5 to 10 weight percent solution to the action of an oxidizing agent selected from the group consisting of peroxides, hydroperoxides, oxygen containing gases and mixtures thereof in a ratio equivalent to 0.002 to 0.33 gram mols of peroxide per 100 grams of polymer, immediately contacting the thus oxidized polymer with a thiol compound having the general formula R—S—H wherein R is selected from the group consisting of alkyl, aryl, alkaryl, and halogen-substituted alkyl, aryl, alkaryl and aralkyl radicals containing from 1 to 16 carbon atoms in a ratio of 0.0015 to 0.15 gram mols of said R—S—H compound per 100 grams of polymer, said contacting being conducted within a temperature range of 25 to 100° F. for from 0.25 to 150 hours, and precipitating the thus modified polymer.

7. A method according to claim 6 wherein said thiol compound is xylyl mercaptan.

8. A method according to claim 6 wherein said thiol compound is tert-dodecyl mercaptan.

9. A method according to claim 6 wherein said thiol compound is penta-chlorothiophenol.

10. A method according to claim 6 wherein said oxidizing agent is benzoyl peroxide.

11. A method according to claim 6 wherein said oxidizing agent is air.

12. A polymer prepared by the method of claim 6.

13. A method of modifying an improved rubbery polymer which has been prepared by polymerizing 1,3-butadiene in an inert hydrocarbon diluent in the presence of a catalyst system consisting essentially of from 1.5 to 10 mols of triisobuylaluminum per mol of titanium tetraiodide, said catalyst being present in an amount of about 0.05 to 10 weight percent based on the monomer charged, at a temperature in the range of about 10 to 50° C., thus forming cis 1,4-polybutadiene, which comprises inactivating the catalyst, adjusting the concentration of polymer in solution to about 2 to 7 weight percent, treating the polybutadiene with an oxidizing agent selected from the group consisting of peroxides, hydroperoxides, oxygen containing gases and mixtures thereof in a ratio equivalent to about 0.002 to 0.33 gram mols of peroxide per 100 grams of polymer, immediately subjecting said polybutadiene to reaction with a thiol compound having the general formula R—S—H wherein R is selected from the group consisting of alkyl, aryl, alkaryl, and halogen-substituted alkyl, aryl, alkaryl and aralkyl radicals containing from 1 to 16 carbon atoms in a ratio of 0.0015 to 0.15 gram mols of said R—S—H compound per 100 grams of polymer, at a temperature in the range of about 25 to 100° C. for about 0.5 to 20 hours, and precipitating the thus modified polymer.

References Cited in the file of this patent

UNITED STATES PATENTS

| | | |
|---|---|---|
| 2,660,563 | Banes et al. | Nov. 24, 1953 |
| 2,832,759 | Nowlin et al. | Apr. 29, 1958 |